United States Patent
Krikorian et al.

(10) Patent No.: US 7,121,502 B2
(45) Date of Patent: Oct. 17, 2006

(54) PSEUDO GPS AIDED MULTIPLE PROJECTILE BISTATIC GUIDANCE

(75) Inventors: Kapriel V. Krikorian, Calabasas, CA (US); Robert A. Rosen, Simi Valley, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 11/043,543

(22) Filed: Jan. 26, 2005

(65) Prior Publication Data

US 2006/0163422 A1    Jul. 27, 2006

Related U.S. Application Data

(63) Continuation-in-part of application No. 11/043,537, filed on Jan. 26, 2005, now abandoned.

(51) Int. Cl.
- F41G 7/30 (2006.01)
- F41G 7/00 (2006.01)
- G01S 13/74 (2006.01)
- G01S 13/00 (2006.01)

(52) U.S. Cl. ............ 244/3.14; 244/3.1; 244/3.11; 701/1; 701/2; 701/3; 701/207; 701/213; 342/42; 342/43; 342/61; 342/62; 342/175; 342/195

(58) Field of Classification Search .......... 244/3.1–3.3; 89/1.51, 1.56; 701/200, 207, 213–216, 1–3; 342/42–52, 58–64, 175, 195, 357.01–357.17
See application file for complete search history.

(56) References Cited

U.S. PATENT DOCUMENTS

| | | | |
|---|---|---|---|
| 3,883,091 A * | 5/1975 | Schaefer | 244/3.13 |
| 4,347,996 A * | 9/1982 | Grosso | 244/3.16 |
| 4,738,411 A * | 4/1988 | Ahlstrom et al. | 244/3.15 |
| 5,056,740 A * | 10/1991 | Roth et al. | 244/3.15 |
| 5,131,602 A * | 7/1992 | Linick | 244/3.14 |
| 5,260,709 A * | 11/1993 | Nowakowski | 342/62 |
| 5,344,105 A * | 9/1994 | Youhanaie | 244/3.14 |
| 5,425,514 A * | 6/1995 | Grosso | 244/3.22 |
| 5,507,452 A * | 4/1996 | Mayersak | 244/3.15 |
| 5,554,994 A * | 9/1996 | Schneider | 342/357.06 |
| 5,657,947 A * | 8/1997 | Mayersak | 244/3.19 |
| 5,855,339 A * | 1/1999 | Mead et al. | 244/3.11 |
| 5,866,838 A * | 2/1999 | Mayersak | 89/1.56 |
| 6,037,899 A * | 3/2000 | Weber | 342/357.06 |
| 6,564,146 B1 * | 5/2003 | Meyer et al. | 701/213 |
| 6,653,972 B1 * | 11/2003 | Krikorian et al. | 342/62 |

\* cited by examiner

*Primary Examiner*—Bernarr E. Gregory
(74) *Attorney, Agent, or Firm*—Leonard A. Alkov; Karl A. Vick

(57) ABSTRACT

A guidance system for guiding each of several projectiles toward a moving target has a platform having a radar system for illuminating the target with a radar signal. Each projectile has a receiver for receiving the radar signal reflected from the target, a transponder for replying to Global Positioning System (GPS) like timing signals from several timing signal sources, and a data link transceiver for establishing a bidirectional data link to the platform. The data link carries the measured frequency shift of the radar signal reflected from the target as measured by the projectile. A computer on the platform computes a relative position of each projectile with respect to the target from tracking the moving target using the radar system and the reply signal from the transponder on each projectile. The data link sends guidance commands from the platform to each projectile to guide the projectile to the target.

12 Claims, 3 Drawing Sheets

PSEUDO GPS AIDED MULTIPLE PROJECTILE BISTATIC GUIDANCE

CROSS-REFERENCE TO RELATED APPLICATIONS

This application is a continuation in part of U.S. Patent and Trademark Office application Ser. No. 11/043,537, filed on Jan. 26, 2005, now abandoned entitled "GPS Aided Multiple Projectile Bistatic Guidance" by Kapriel V. Krikorian, et at to which reference is hereby made.

BACKGROUND OF THE DISCLOSURE 1. Field of the Invention

The present invention relates to multiple projectile guidance. More specifically, the present invention relates to systems and methods for guiding a plurality of projectiles where GPS satellite signals are denied.
2. Description of the Related Art
Navy ships are exposed to low flying, fast, and highly maneuverable missile threats. In order to provide the ships with an effective missile defense system, high accuracy measurements of incoming missile targets and precision guidance of anti-missile projectiles are required.

Many guidance systems have been developed for projectiles. In a typical radar based guidance system, the projectile is guided to the target by guidance signals developed from tracking data obtained either by a shipboard radar system or by a radar system located totally, or partially, within the projectile. The former system is commonly referred to as a command guidance system and the latter as a homing guidance system.

In a command guidance system, a high-resolution shipboard radar system tracks both the target and the projectile, calculates the proper guidance signals for the projectile based on the generated tracking data, and transmits the signals to the projectile to enable the projectile to intercept the target.

In a homing guidance system, the target tracking radar system is located totally or partially within the projectile. An active homing guidance system uses a monostataic radar system where both the radar transmitter and receiver are located in the projectile. A semi-active guidance system uses a bistatic radar system where a radar transmitter located remotely from the projectile (such as onboard a platform, such as a ship) illuminates the target and the reflected returns are received by a receiver located on the projectile. The tracking data from the radar measurements are then used to calculate the proper guidance signals to direct the projectile to the target.

Most of the monostatic and bistatic systems are designed for use with missiles and larger caliber projectiles (greater than 3 inches in diameter), whereas the optimum caliver of projectiles for high rate-of-fire guns is generally about 1 inch in diameter. Prior art guidance systems do not work well with the 1 inch diameter projectiles. In particular, prior art approaches do not accurately measure the line-of-sight angular rate to the target and or projectile with enough precision for the application. Command guidance systems with a high resolution monostatic shipboard radar are capable of measuring line-of-sight angular rate. However, these measurements are generally not as accurate as measurements made from the projectile, as with homing guidance systems. Homing systems, however, require a radar receiver as part of the projectile. The size of the smaller caliber projectiles places a constraint on the size of the radar receiver and/or antenna on the projectile. With a small antenna, a relatively accurate range rate can be measured, but the angular rate tends to be imprecise.

One critical factor required for effective projectile guidance is an accurate measurement of the line-of-sight angular rate to the target relative to the projectiles. Guidance algorithms depend on line-of-sight angular rate information to successfully direct a projectile to its target. Poor line-of-sight angular rate measurements may cause a projectile targeting error. Such considerations are detailed in U.S. Pat. No. 6,653,972 to Krikorian and Rosen, issued Nov. 25, 2003. Hence, there is a need in the art for an improved method or system for accurately measuring line-of-sight angular rates for precision guidance of small caliber projectiles.

Projectile guidance systems need to be effective under all trajectories possible for the target as well as the projectile(s) directed to it. In some circumstances, prior art systems are vulnerable to multipath errors arising within the guidance system from the relative position of the target, the projectile(s) and the shipboard radar illuminating the target. In effect, while the targeting accuracies of the bistatic differential range rate methods offer a degree of accuracy, they rely on accurate determination of actual projectile velocities and relative positions with respect to the target and the shipboard radar. Accurate projectile velocities and positions however may be difficult to obtain in the face of various radar related limitations, such as multipath effects where the target is traveling at low altitudes.

In the parent application, the multipath effects on radar measurements are reduced by using Ground Positioning System (GPS) receivers of timing signals from geo-orbiting satellites to provide navigation information to in flight projectiles directed to a radar tracked target. In some circumstances, however, the GPS signals from the satellites may be unavailable because of interference, jamming or other causes. The lack of GPS satellite supplied signals to the projectiles may adversely affect the operation of the guidance system as their exact position may not be immediately apparent.

SUMMARY OF THE INVENTION

Above limitations of the prior art are minimized by a guidance system for guiding each projectile of a plurality of projectiles towards a moving target, said guidance system comprising:

a platform having a radar system on said platform for tracking, i.e. measuring position, velocity and acceleration of said moving target, and illuminating said moving target with a radar signal;

a plurality of timing signal sources for transmitting timing signals, each of said timing signal sources located at a known spatial position;

each projectile of said plurality of projectiles having a receiver for receiving said radar signal reflected from said target and for measuring a frequency shift of said radar signal reflected from said target, said reflected radar signal shifted in frequency because of motion of said moving target with respect to each projectile of said plurality of projectiles;

each projectile of said plurality of projectiles having a transponder to receive said timing signals and generate reply signals in response to said timing signals, said reply signals received by said platform, said reply signals including an identity of said each projectile of said plurality of projectiles generating said reply signals;

each projectile of said plurality of projectiles having a projectile datalink (unidirectional or bi-directional) transceiver for establishing a data link to said platform, said data link carrying information descriptive of said frequency shift of said radar signal reflected from said target;

a receiving antenna on said platform for receiving said reply signals;

a computer on said platform, or remote from said platform, for computing a relative position of each projectile of said plurality of projectiles with respect to said target from tracking said moving target using said radar system, said information descriptive of said frequency shift, and said reply signals.

The datalink is a bidirectional link between said platform and each projectile of said plurality of projectiles, said datalink carrying guidance commands from said platform to each projectile of said plurality of projectiles, said guidance commands for guiding each projectile of said plurality of projectiles to said target.

The projectile datalink transceiver uses a known, carrier frequency to transmit data to the platform. The platform has a platform datalink transceiver for measuring deviations from the known, carrier frequency from each projectile. These deviations are induced by the relative motion of the projectile with respect to the platform, providing another input (nearly instantaneous) for relative projectile velocity with respect to the platform.

DETAILED DESCRIPTION OF THE INVENTION

The present invention describes an apparatus and method for deriving an accurate velocity vector for each of a plurality of projectiles and precise relalative position between projectiles and a target in a GPS denied environment. Unlike the prior art, this invention eliminates the need for a platform based radar to accurately track projectiles in the presence of multipath conditions induced by the geometry of low flying incoming targets.

Figure 1:
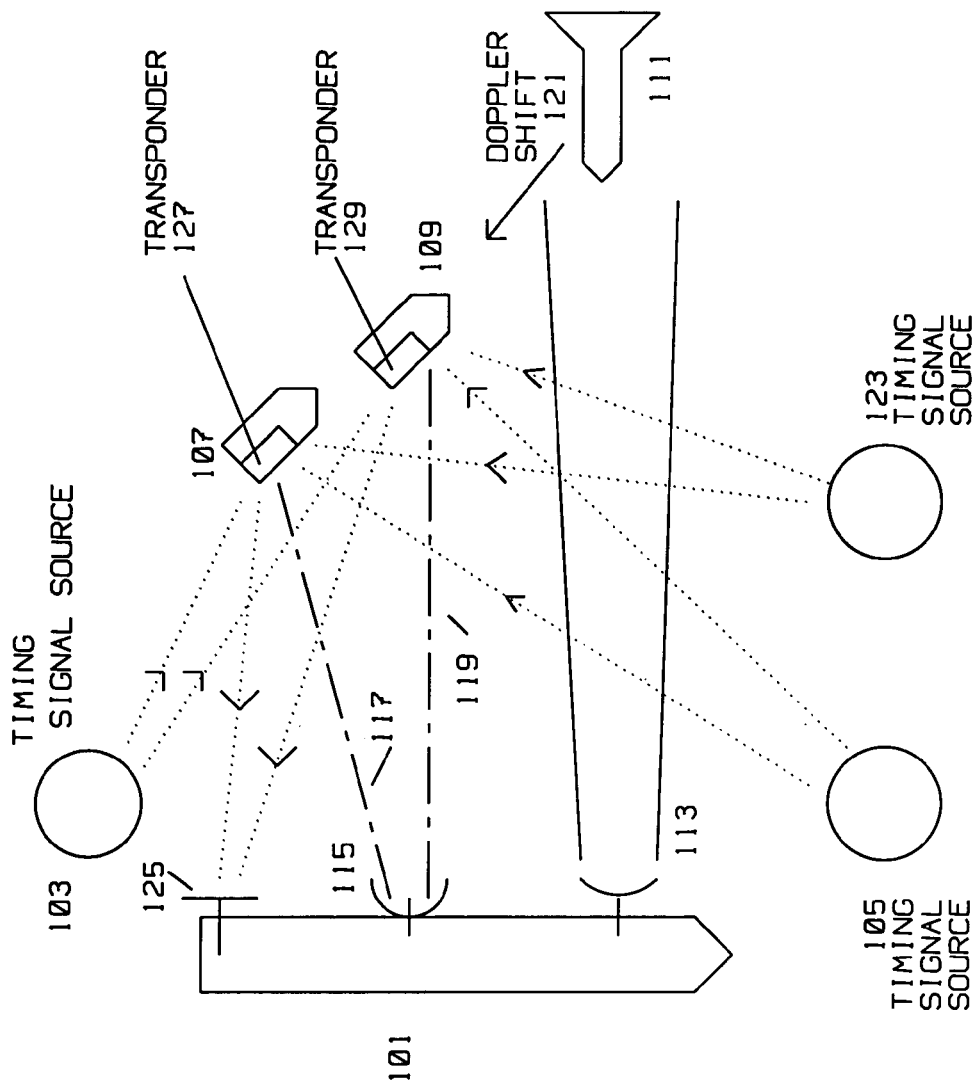
FIG. 1 shows the guidance system of the present invention.

FIG. 1 shows a projectile guidance apparatus and method of the present invention based on multiple bistatic projectiles 107, 109, each having a timing signal transponder 127, 129 for replying to navigation timing information from a plurality of timing signal sources 103, 105, 123. Timing signal sources 103, 105, and 123 generate timing signals similar to those supplied by Global Positioning Satellites currently in use with Global Positioning Systems (GPS). The timing signals from timing signal sources 103, 105 and 123 are replied to by a plurality of projectiles such as projectiles 107, 109 to platform 101. Each projectile such as projectile 107, 109 has a transponder for a) replying to (re-transmitting) the timing signals received from timing signal sources 103,105 and 123 as well as b) introducing an identification code in the reply signal for identifying the projectile (such as 107 and 109) where the reply signal is being relayed from.

Platform 101 receives the reply signal using antenna 125 and analyzes reply signals to determine the position of projectiles 107 and 109 in space with respect to the position of timing signals sources 103, 105 and 123.

Platform 101, typically a ship, submarine or aircraft has a radar 113 for tracking, and illuminating target 111. There is no need to illuminate projectiles 107 and/or 109 concurrently with target 111. Radar illuminated target 111 reflects Doppler shifted radar signal 121 towards radar receivers installed in projectiles 107 and 109. Within projectiles 107 and 109, the radar signal reflected from target 111 is compared, typically using its Doppler shifted frequency, to the originally transmitted radar signal from platform 101, extracting the Doppler frequency shift. The Doppler shift is proportional to the velocity of target 111 with respect to either projectile 107 or projectile 109, depending on which projectile measures the Doppler shift 121 reflected from target 111.

Timing signal sources 103, 105 and 123 are located at known position(s) from a spatial reference point, such as platform 101. In one embodiment, signal sources 103 and 105 are on a remote location from platform 101, separated by a first distance, at about the same elevation, e.g. sea level. In contrast, timing signal source 123 is at an altitude above sea level, and separated by a second distance from signal sources 103 and 105. While only three timing signal sources are shown, more than three timing signal sources will enhance system operation, while using only two signal sources may reduce positional accuracy. A relatively large separation between timing signal sources allows better spatial resolution at projectiles 107 and 109 in the plane parallel to the horizon. The elevation of of timing signal source 123 facilitates better height measurements at projectiles 107 and 109.

In another embodiment, four timing signal sources are used, such as low power 1 watt W band transmitters located on platform 101. These transmitters emit timing signals modulated by GPS like code and are linked to a common clock. Transponders 127 and 129 in each projectile 107 and 109 respectively relay these timing signals and introduce an identification of a particular projectile for processing by the processing station located on platform 101. The processing station determines from the relayed timing signals the position and velocity of each projectile.

In the alternative, if timing signal sources 103, 105 and/or 109 are remote from platform 101 and moving, they report their position to platform 101 with respect to a reference point at short intervals. Depending on the velocities and acceleration of timing signal sources 103, 105 and/or 109, the update rate for their position is multiple times per second.

Data link antenna 115 is also located on platform 101 for facilitating two way data communication between projectiles 107, 109 and platform 101. For example, data link 117 connects projectile 117 with platform 101 via antenna 115, while data link 119 connects projectile 109 with platform 101.

Figure 2:
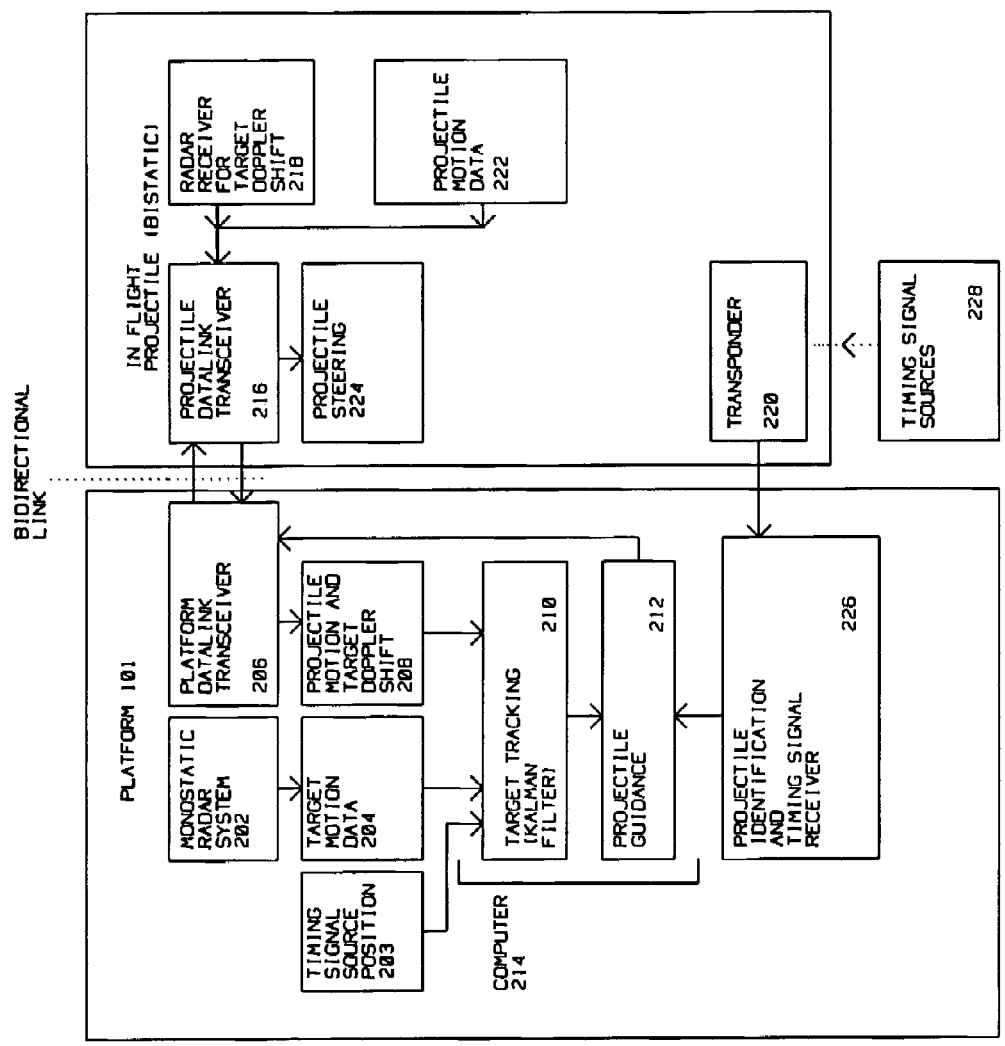
FIG. 2 shows the operational blocks of the guidance system of the present invention.

FIG. 2 shows how the components in FIG. 1 operate. Aboard platform 101 is monostatic radar system 202 for measuring target motion data 204 using radar antenna 113 for illuminating target 111 as well as measuring its position, velocity and acceleration (target motion) using radar techniques. The target motion data 204 gathered using radar system 202 is sent to target tracking 210 where target position, velocity and acceleration are updated typically using a Kalman Filter or similar target tracking method. Concurrently, projectile motion data 222, and target doppler shift 218 are sent via projectile data link transceiver 216 to Platform Data Link Transceiver 206 on platform 101. Projectile Motion and target Doppler shift 208 extracts projectile and target motion from Platform data link 206 and transmits it to Target tracking 210. Target tracking 210 supplies updated position information to projectile guidance 212.

The timing signal from timing signal sources 228 is received by transponder 220 located on the (in flight) projectile, such as projectile 107 and/or 109. Transponder 220 relays the timing signal and adds an identifier uniquely identifying a particular projectile, thus creating a reply from transponder 220. The reply is received on platform 101 where it is decoded by Projectile Identification and Timing Signal Receiver 226 to locate the position of the projectile transmitting the reply. Projectile position is input into projectile guidance 212 where the target position generated by target tracking 210 is compared to the desired impact point.

In turn, projectile guidance 212 computes projectile steering commands in view of the changing position, velocity and acceleration (motion) of the plurality of projectiles 107, 109, and target 111. The steering commands are sent via Platform Datalink Transceiver 206 to Projectile Datalink Transceiver 216 to projectile steering 224, thus re-orienting projectiles 107, 109 towards target 111 in response to the latest target tracking output and projectile motion from transponder 220.

Operating Parameters.

Using the elements described in FIG. 1 and FIG. 2, accurate inertial velocities and relative positions of the projectiles with respect to platform 101 and target 111 are obtained. These are combined with the multiple bistatic range rates and ranges derived from the projectiles 107, 109 transmitted using data links 117 and 119 to derive target 111 three dimensional motion. Guidance commands are computed using computer 114 in projectile guidance 212 and transmitted to each projectile 107 and 109. These guidance commands are based on the on the inferred line of sight rate of target 111 relative to each projectile 107, 109. Because the projectiles need not be illuminated or tracked by radar 113 on platform 101, the projectiles can have wider separation, i.e. have a wider baseline, facilitating better triangulation to the target 111. Further advantage is gained from choosing a higher trajectory for each of projectiles 107, 109 thus reducing the influence of multipath effects of a low flying projectile or target.

The projectile roll angle is derived based on the Doppler shift of a signal from a rotating projectile for a side mounted patch antenna. For example, a 3 cm diameter projectile has a 50 degree peak to peak phase modulation of the GPS signal.

The velocity error that can be achieved with GPS carrier phase measurements in a dynamic guidance scenario is given approximately by $$\delta v = \frac{1}{2\pi} \cdot \frac{\lambda g}{\tau} \sqrt{\frac{6}{snr} \cdot \frac{ta}{\tau} \cdot \frac{R}{\omega s}}$$

where
$\lambda g$ is the GPS carrier wavelength;
$\tau$ is the guidance time constant;
ta is the coherent GPS processing time;
$snr\tau$ is the signal to noise ratio achieved in time ta;
R is range of projectiles;

$\omega s$ is separation between timing signal transponders (receivers) located on projectiles 107, 109.

For example, with $\lambda g$=0.003 m , $\tau$=0.05 seconds, ta=0.01 seconds, and snr at 25 db (assume 1 watt transmitter, losses of 10 dB in 4 mm/hr of rain), R=3 kilometers and ws=10 meters, $\delta v$ computes to 0.2 meters/sec.

The line of sight rates which are critical to the projectile guidance are derived form the range rates between the projectiles 107, 109 and the target 111 as well as projectile locations ad velocities. Wide separation between projectiles, or wide baselines lead to more accurate line of sight rate estimates. The line of sight angular rate errors due to projectile velocity errors $\delta \omega$ are given approximately by $$\delta \omega = \frac{1}{B} \delta v$$

For example, if the baseline B=20 meters, and $\delta v$=0.2 meters/second, then $\delta \omega$=10 milliradians/second for the worst direction (typically vertical).

An approximation of the miss distance $\delta d$ is given by $$\delta d = \left(\frac{Rtp^2}{v}\right) \frac{\delta \omega}{\sqrt{2}}$$

where Rtp is the projectile to target range;
$v$ is the closing rate (velocity) to the target.

For example, if Rtp is 250 meters, v=1500 meters/second, and $\delta \omega$=10 milliradians/second, then $\delta$=12.0 inches In the present invention the projectiles 107, 109 are not tracked or illuminated by radar 113. This avoids the effects of multipath. By establishing an arching trajectory for projectiles 107, 109, for example with a 5 g downward acceleration, the critical terminal phase of the flight can have substantial downward velocity. This allows the timing signal (Pseudo GPS) multipath to be rejected by range and Doppler processing.

Operating Method

Figure 3:
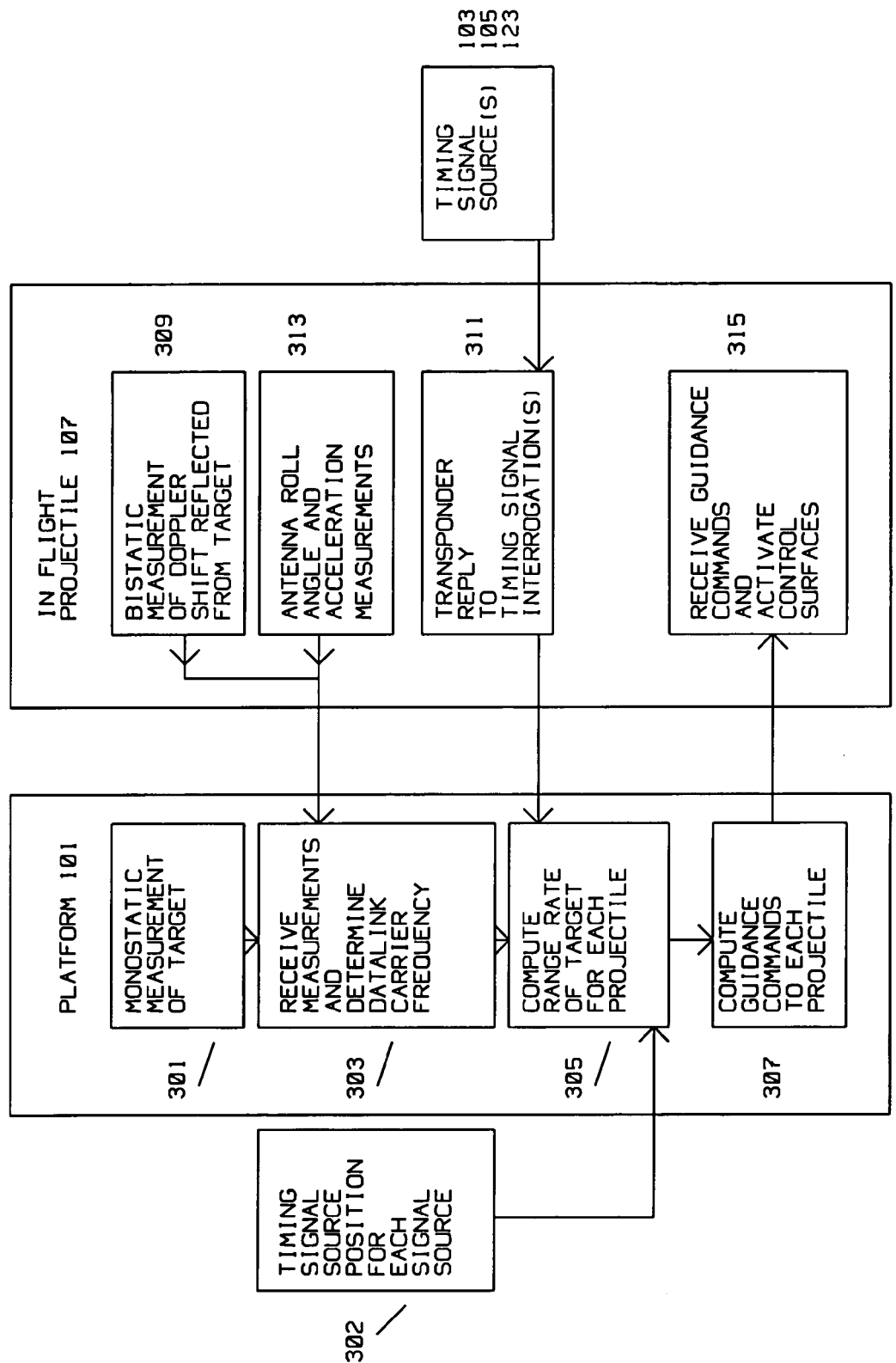
FIG. 3 shows a typical flow diagram of the methods used in the present invention.

FIG. 3 shows the method used in the present invention to guide projectiles 107, 109 towards a target 111 using the structure shown in FIG. 1 and FIG. 2.

Monostatic measurement of target 301 uses monostatic radar system 202 to measure distance, velocity and acceleration, (motion) of target 111. Bistatic measurement of doppler shift from target 309 located within each projectile 107 109 reports target 111 Doppler shift reflected from target 111 as seen by each projectile using bidirectional datalink 117, or 119, from each projectile, respectively.

Position measurements are derived from transponder reply to timing signal interrogation (s) 311 in each projectile. This transponder reply is intiated by plurality of timing sources such as 103,105, and 123. Antenna roll angle and acceleration measurements 313 for each projectile are also transmitted to platform 101, using Receive Measurements and Determine Datalink Carrier-Frequency 303. The change in carrier frequency is again due to Doppler shift, this time for velocity between platform 101 and each projectile 107, 109, providing another fast updated parameter for the motion of the projectile. The local oscillator frequency for each projectile is known in advance, hence the Doppler shift is accurately measured.

The measurements of antenna roll angle and acceleration 313 and bistatic target measurements 309 reported via the datalink from projectiles 107, 109 are combined with monostatic radar target measurements to compute target motion in Compute Range Rate for each Projectile 305. In response to this range rate result, Compute Guidance Commands to each Projectile 307 computes steering/guidance commands for projectiles 107 and 109 and sends the steering commands using bidirectional data link 117, 119 to the projectiles. Within the projectiles, Receive Guidance Commands and Activate Control Surfaces 315 translates the guidance commands received from platform 101 into the displacement of flight control surfaces directing the projectiles in a path towards the target, in accordance with guidance commands.

Timing signal source position for each signal source 302 updates the actual position of timing signal sources 103, 105 and 123 with respect to a reference, such as platform 101. This relative position is used by Compute Range rate of Target for Each Projectile 305 to interpret the transponder reply from each projectile and compute the projectiles position in a manner similar to Ground Positioning Satellite (GPS) geo-location.

Summary

A guidance system is described for guiding each projectile of a plurality of projectiles (107, 109) towards a moving target (111). The guidance system comprises:

a platform (101) having a radar system (113) on said platform (101) for tracking, (i.e. measuring position, velocity and acceleration) said moving target (111) and illuminating said moving target (111) with a radar signal;

a plurality of timing signal sources (103, 105, 123) for transmitting timing signals, each of said timing signal sources located at a known spatial position;

each projectile of said plurality of projectiles having a receiver (218) for receiving said radar signal reflected from said target (111) and for measuring a frequency shift of said radar signal reflected from said target (111), said reflected radar signal shifted in frequency because of motion of said moving target (111) with respect to each projectile of said plurality of projectiles (107,109);

each projectile of said plurality of projectiles (107,109) having a transponder (127,129) to receive said timing signals and generate reply signals in response to said timing signals, said reply signals received by platform (101), said reply signals including an identity of said each projectile of said plurality of projectiles generating said reply signals;

each projectile of said plurality of projectiles (107,109) having a projectile datalink transceiver (216) for establishing a data link (117) to said platform (101), said data link (117) carrying information descriptive of said frequency shift of said radar signal reflected from said target (111);

a receiving antenna (125) on said platform (101) for receiving said reply signals;

a computer 214 (generally located on said platform (101)) for computing a relative position of each projectile of said plurality of projectiles with respect to said target from tracking said moving target (111) using said radar system (113), said information descriptive of said frequency shift, and said reply signals from said receiving antenna (125).

In one embodiment said datalink (117) is a bidirectional link between said platform and each projectile of said plurality of projectiles (107,109), said datalink (117) carrying guidance commands from said platform (101) to each projectile of said plurality of projectiles (107,109), said guidance commands for guiding each projectile of said plurality of projectiles (107,109) to said target (111).

In one embodiment, the guidance commands are computed by computer (214) on platform (101), although, in another embodiment, this function is performed within each projectile.

Projectile datalink transceiver (216) uses a fixed, known frequency to transmit to platform (101). Platform (101) has a platform datalink transceiver (205) for measuring deviations from the fixed, known frequency, said deviations (Dopler shifts) induced by the relative motion of said projectile with respect to said platform (101).

Above method and apparatus is preferably used to guide projectiles 107, 109 to targets that are not geo-located using the radar aboard platform 101. That is, the projectiles are not tracked with the radar, only the target is. This eliminates the requirement in the prior art for the radar located on platform 101 to track the plurality of projectiles as well as the target. This invention avoids the arduous task of concurrently tracking projectiles using radar in the face of multipath effects caused by low flying targets.

All references cited in this document are incorporated herein in their entirety by reference.

Although presented in exemplary fashion employing specific embodiments, the disclosed structures are not intended to be so limited. For example, while target tracking 210 and projectile guidance 212 computations are shown within computer 214 located on platform 101, it is envisioned that both target tracking 210 and projectile guidance 212 can be moved internal to projectiles 107 and 109. If so, time stamped data describing the motion of target 111 derived from monostatic radar 202 is transmitted from platform 101 to projectiles 107 and 109. This would reduce the amount of data to be exchanged between platform 101 and projectiles 107 and 109, thus reducing the data rate and allowing for a more robust, redundant data transmission per unit time. The datalink now only needs to be unidirectional, from platform 101 to projectiles 107 and 109, as the tracking function is moved into a computer within each projectile 107 and 109.

Similarly, in an alternative embodiment, where more computational power is packed within each projectile, the signal from timing signal sources 103, 105 and 123 is used directly within each projectile to determine its position, and combined with the monostatic motion measurement(s) of target 111 from platform 101. Thus, guidance commands are generated within each projectile to guide the projectile to target 111.

Those skilled in the art will also appreciate that numerous changes and modifications could be made to the embodiment described herein without departing in any way from the invention.

The invention claimed is:

1. A guidance system for guiding each projectile of a plurality of projectiles towards a moving target, said guidance system comprising:

a platform having a radar system on said platform for tracking said moving target and illuminating said moving target with a radar signal;

a plurality of timing signal sources for transmitting timing signals, each of said timing signal sources located at a known spatial position;

each projectile of said plurality of projectiles having a receiver for receiving said radar signal reflected from said target and for measuring a frequency shift of said radar signal reflected from said target, said reflected radar signal shifted in frequency because of motion of said moving target with respect to each projectile of said plurality of projectiles;

each projectile of said plurality of projectiles having a transponder to receive said timing signals and generate reply signals in response to said timing signals, said reply signals received by platform, said reply signals including an identity of said each projectile of said plurality of projectiles generating said reply signals;

each projectile of said plurality of projectiles having a projectile datalink transceiver for establishing a data link to said platform, said data link carrying information descriptive of said frequency shift of said radar signal reflected from said target;

a receiving antenna on said platform for receiving said reply signals;

a computer for computing a relative position of each projectile of said plurality of projectiles with respect to said target from tracking said moving target using said radar system, said information descriptive of said frequency shift, and said reply signals.

2. A guidance system as described in claim 1 wherein said datalink is a bidirectional link between said platform and each projectile of said plurality of projectiles, said datalink carrying guidance commands from said platform to each projectile of said plurality of projectiles, said guidance commands for guiding each projectile of said plurality of projectiles to said target.

3. A guidance system as described in claim 2 wherein said guidance commands are computed by said computer.

4. A guidance system as described in claim 3 wherein said computer is located on said platform.

5. A guidance system as described in claim 4 wherein each of said projectile datalink transceiver uses a frequency to transmit to said platform.

6. A guidance system as described in claim 5 wherein said platform has a platform datalink transceiver for measuring deviations from said frequency, said deviations induced by a second relative motion of said projectile with respect to said platform.

7. A method for guiding each projectile of a plurality of projectiles towards a moving target, said method comprising the steps of:

tracking said moving target and illuminating said moving target with a radar signal from a radar system on a platform;

receiving said radar signal reflected from said target and measuring a frequency shift of said radar signal reflected from said target for each projectile of said plurality of projectiles, said reflected radar signal shifted in frequency because of motion of said moving target (111) with respect to each projectile of said plurality of projectiles;

receiving timing signals from two or more timing signal sources for each projectile of said plurality of projectiles;

using said timing signals received within each projectile of said plurality of projectiles to generate a reply signal to be received by said platform, said reply signal including an identity of said each projectile of said plurality of projectiles generating said reply signal;

transmitting from each projectile of said plurality of projectiles using a projectile datalink transceiver for establishing a data link to said platform, said data link carrying said frequency shift of said radar signal reflected from said target as measured by each projectile of said plurality of projectiles;

computing using a computer a relative position of each projectile of said plurality of projectiles with respect to said target from tracking said moving radar target using said radar system and said reply signals.

8. A method as described in claim 7 wherein said datalink is a bidirectional link between said platform and each projectile of said plurality of projectiles, said datalink carrying guidance commands from said platform to each projectile of said plurality of projectiles, said guidance commands for guiding each projectile of said plurality of projectiles to said target.

9. A method as described in claim 8 wherein said guidance commands are computed by said computer.

10. A method as described in claim 9 wherein said computer is located on said platform.

11. A method as described in claim 10 wherein each of said projectile datalink transceiver uses a frequency to transmit to said platform.

12. A method as described in claim 11 wherein said platform has a platform datalink transceiver for measuring deviations from said frequency, said deviations induced by a second relative motion of said projectile with respect to said platform.

* * * * *